(12) United States Patent
Yamagata et al.

(10) Patent No.: US 8,223,442 B2
(45) Date of Patent: Jul. 17, 2012

(54) OBJECTIVE LENS FOR OPTICAL PICK-UP

(75) Inventors: Naoki Yamagata, Tokyo (JP); Shuichi Takeuchi, Saitama (JP)

(73) Assignee: Hoya Corporation, Tokyo (JP)

( * ) Notice: Subject to any disclaimer, the term of this patent is extended or adjusted under 35 U.S.C. 154(b) by 0 days.

(21) Appl. No.: 12/021,516

(22) Filed: Jan. 29, 2008

(65) Prior Publication Data
US 2008/0180815 A1 Jul. 31, 2008

(30) Foreign Application Priority Data
Jan. 29, 2007 (JP) ................................ 2007-017675

(51) Int. Cl.
G02B 13/18 (2006.01)
G02B 3/02 (2006.01)

(52) U.S. Cl. ........................................................ 359/719

(58) Field of Classification Search .................. 359/719; 369/44.23, 112.01, 112.23
See application file for complete search history.

(56) References Cited

U.S. PATENT DOCUMENTS

| | | | |
|---|---|---|---|
| 6,411,422 B2 | 6/2002 | Ota et al. | |
| 6,411,442 B1 | 6/2002 | Ota et al. | |
| 6,480,344 B1 | 11/2002 | Maruyama | |
| 6,512,640 B2 | 1/2003 | Ota et al. | |
| 6,819,504 B2* | 11/2004 | Maruyama | 359/719 |
| 6,898,168 B2 | 5/2005 | Kimura et al. | |
| 7,193,793 B2 | 3/2007 | Murakami et al. | |
| 7,317,180 B2* | 1/2008 | Konno et al. | 250/208.1 |
| 7,411,884 B2 | 8/2008 | Takeuchi | |
| 2003/0210639 A1 | 11/2003 | Takeuchi et al. | |
| 2003/0231407 A1 | 12/2003 | Koreeda et al. | |
| 2004/0105376 A1* | 6/2004 | Kubo | 369/112.23 |
| 2005/0231826 A1 | 10/2005 | Murakami et al. | |
| 2006/0007394 A1* | 1/2006 | Shirayanagi | 351/177 |
| 2006/0077862 A1 | 4/2006 | Ikenaka et al. | |

FOREIGN PATENT DOCUMENTS

| | | |
|---|---|---|
| CN | 1286407 | 3/2001 |
| CN | 1677134 | 10/2005 |
| JP | 2001-52336 | 2/2001 |
| JP | 2001-216674 | 8/2001 |
| JP | 2001-324673 | 11/2001 |
| JP | 2003-114383 | 4/2003 |
| JP | 2003-279851 | 10/2003 |
| JP | 2004-39161 | 2/2004 |
| JP | 2004-103216 | 4/2004 |
| JP | 2004-145003 | 5/2004 |
| JP | 2005-11494 | 1/2005 |
| JP | 2005-156719 | 6/2005 |
| JP | 2006-114081 | 4/2006 |

OTHER PUBLICATIONS

English language Abstract of JP 2003-114383.

(Continued)

*Primary Examiner* — Alicia M Harrington
(74) *Attorney, Agent, or Firm* — Greenblum & Bernstein, P.L.C.

(57) ABSTRACT

There is provided an objective lens for an optical pick-up. The objective lens is formed to be a single-element plastic lens having a first surface and a second surface. The first surface is configured to have, within an effective diameter, an inflection point at which a second derivative of a sag of the first surface takes a value of 0. Further, the objective lens having a numerical aperture larger than or equal to 0.75.

22 Claims, 7 Drawing Sheets

OTHER PUBLICATIONS

English language Abstract of JP 2005-156719.
English language Abstract of JP 2004-39161.
English language Abstract of JP 2005-11494.
English language Abstract of JP 2001-52336.
English language Abstract of JP 2003-279851.
Chinese Office Action dated Nov. 18, 2010 that issued with respect to Chinese Patent Application No. 200810009216.9, along with an English language translation thereof.

* cited by examiner

WAVEFRONT ABERRATION

SPHERICAL ABERRATION, SINE CONDITION

WAVEFRONT ABERRATION

Y=0.00

SPHERICAL ABERRATION, SINE CONDITION

WAVEFRONT ABERRATION

SPHERICAL ABERRATION, SINE CONDITION

OBJECTIVE LENS FOR OPTICAL PICK-UP

BACKGROUND OF THE INVENTION

The present invention relates to an objective lens for an optical pick-up of an optical disc drive for recording information to and/or reproducing information from an optical disc, such as a blu-ray disc, having a higher recording density than a DVD.

New-standard optical discs, such as a BD (Blu-ray Disc), having still higher recording density than DVD, are being brought into practical use in recent years. In general, such an objective lens is configured to converge a laser beam having a wavelength of approximately 400 nm. Objective lenses for a blu-ray disc are disclosed, for example, in Japanese Patent Provisional Publications Nos. 2003-114383A (hereafter, referred to as document #1) and 2005-156719A (hereafter, referred to as document #2). Each of the objective lenses disclosed in these publications is a single-element lens made of glass.

In order to configure an objective lens to form a more suitable beam spot for information recording/reproducing of an optical disc, it is required to increase a rim intensity (i.e., a ratio of an intensity of light passed through a perimeter of the objective lens to an intensity of light passed through a part in the vicinity of an optical axis of the objective lens). Each of Japanese Patent Provisional Publications Nos. 2004-39161A (hereafter, referred to as document #3) and 2005-11494A (hereafter, referred to as document #4) describes that a rim intensity can be increased by forming an anti-reflection coating on a lens surface of the objective lens.

The objective lenses disclosed in the documents #1 to #3 are glass lenses. A glass lens has a drawback that it is heavy in weight and expensive. By contrast, a plastic lens does not have such a drawback. However, in order to give the same refractive power as that of a glass lens to a plastic lens, a radius of curvature of each surface of the plastic lens inevitably decrease particularly on a light source side. As a result, the gradient of a light source side surface of the plastic lens becomes large in the perimeter of the light source side surface, and thereby the manufacturability of the plastic lens deteriorates.

More specifically, a plastic lens is manufactured by injection molding through use of a mold, and the mold is made by cutting a metal piece with a bite while rotating the metal piece using a turning machine. If the metal piece has to be cut to have a steep surface, accurate cutting becomes difficult.

It becomes also difficult to measure accurately a condition of a surface of a manufactured plastic lens or a processed surface of a mold with a contact probe because a steep portion of the surface of the plastic lens or the mold has a large changing amount of sag with respect to a distance from a center (of the lens or the mold) and therefore the measured sag amount changes considerably even when a positional error of the probe in a radial direction is very small.

In addition, coating of such a lens surface having a steep portion is difficult. That is because if the gradient of a lens surface on which substance of vapor deposition is to be adhered is large, adhesion of the substance of vapor deposition to the lens surface deteriorates. In this case, the uniformity of the thickness of the coating may deteriorate, or the uniformity of the refractive power of the plastic lens may deteriorate. Furthermore, if the gradient of a lens surface is large, transmissivity of the lens may decrease and thereby a property (e.g., a jitter amount) of an optical disc drive having the lens may be badly affected.

The objective lens disclosed in document #3 is made of glass and is provided with a single layer coating. However, if the material of the objective lens is plastic, it becomes impossible to secure a relatively high rim intensity because in this case a difference in refractive index between the material of the objective lens and the coating is small and therefore adequate performance of anti-reflection can not be achieved.

The coating disclosed in document #4 is configured such that an maximum wavelength of a light beam incident on the objective lens at an incident angle of 0 is set at 680 nm. However, in this case, the thickness of the coating is inadequate at the perimeter of the objective lens and it becomes impossible to increase transmissivity. Consequently, it becomes impossible to increase the rim intensity.

SUMMARY OF THE INVENTION

The present invention is advantageous in that it provides an objective lens made of plastic configured to have a numerical aperture for a high density optical disc, such as a blu-ray disc, and to be easily processed, measured and coated without decreasing transmissivity.

According to an aspect of the invention, there is provided an objective lens for an optical pick-up. The objective lens is formed to be a single-element plastic lens having a first surface and a second surface. The first surface is configured to have, within an effective diameter, an inflection point at which a second derivative of a sag of the first surface takes a value of 0. Further, the objective lens having a numerical aperture larger than or equal to 0.75.

Such a configuration makes it possible to form the perimeter of the first surface to have a gentle gradient, and therefore to provide an objective lens made of plastic configured to have a numerical aperture for a high density optical disc, such as a blu-ray disc, and to be easily processed, measured and coated without decreasing transmissivity.

In at least one aspect, the objective lens satisfies a condition:

$$0.94 < h(x) \leq 0.99 \qquad (1)$$

where h(x) represents a height of the inflection point in a pupil with respect to an optical axis of the objective lens.

In at least one aspect, the objective lens satisfies a condition:

$$1.15 < f < 1.45 \qquad (2)$$

where f represents a focal length of the objective lens.

In at least one aspect, the objective lens satisfies a condition:

$$1.20 < (SAG1)'/n < 1.65 \qquad (3)$$

where (SAG1)' represents a first derivative of the sag of the first surface at the inflection point, and n represents a refractive index of the objective lens.

In at least one aspect, the objective lens satisfies a condition:

$$-0.60 < ((SAG2)'/n)_{MIN} \leq -0.10 \qquad (4)$$

where $((SAG2)'/n)_{MIN}$ represents a minimum value of (SAG2)'/n, (SAG2)' represents a first derivative of a sag of the second surface, and n represents a refractive index of the objective lens.

In at least one aspect, the objective lens satisfies a condition:

$$0.77 < d/(f \cdot n) < 1.10 \qquad (5)$$

where f represents a focal length of the objective lens, d represents a lens thickness of the objective lens, and n represents a refractive index of the objective lens.

In at least one aspect, the objective lens satisfies a condition:

$$-1.50 < r1/r2 < -0.60 \quad (6)$$

where r1 represents a radius of curvature of the first surface, and r2 represents a radius of curvature of the second surface.

In at least one aspect, the first surface is located on a light source side and the second surface is located on an optical disc side.

In at least one aspect, the first surface has an anti-reflection coating formed thereon, the anti-reflection coating formed on the first surface satisfies a condition:

$$1.00 < Tp/Tc < 1.40 \quad (7)$$

where Tc represents transmissivity of a circular central part defined within a range of 10 percent of the effective diameter with respect to a center of the first surface, and Tp represents transmissivity of a ring-shaped part defined outside of 90 percent of the effective diameter with respect to the center of the first surface, and the objective lens satisfies a condition:

$$1.75 < \lambda_0/\lambda_{min} < 2.00 \quad (8)$$

where $\lambda_0$ represents a wavelength at which reflectivity of the anti-reflection coating takes a minimum value for a beam incident perpendicularly on the anti-reflection coating, and $\lambda_{min}$ represents a minimum wavelength of wavelengths of laser beams to be used.

In at least one aspect, the objective lens has a refractive index lower than 1.58 with respect to the minimum wavelength $\lambda_{min}$ of all of the wavelengths of the laser beams to be used.

In at least one aspect, the anti-reflection coating formed on the first surface has a two-layer structure, the second surface has an anti-reflection coating formed thereon, and the anti-reflection coating formed on the second surface has a two to four-layer structure.

According to another aspect of the invention, there is provided an optical system of an optical pick-up. The optical system includes a light source which emits a light beam, and an objective lens on which the light beam is incident. In this configuration, the objective lens may be configured to have one of the above mentioned properties.

Such a configuration makes it possible to form the perimeter of the first surface of the objective lens to have a gentle gradient, and therefore to provide an objective lens made of plastic configured to have a numerical aperture for a high density optical disc, such as a blu-ray disc, and to be easily processed, measured and coated without decreasing transmissivity.

BRIEF DESCRIPTION OF THE ACCOMPANYING DRAWINGS

DETAILED DESCRIPTION OF THE EMBODIMENTS

Hereinafter, an embodiment according to the invention is described with reference to the accompanying drawings.

Figure 1:
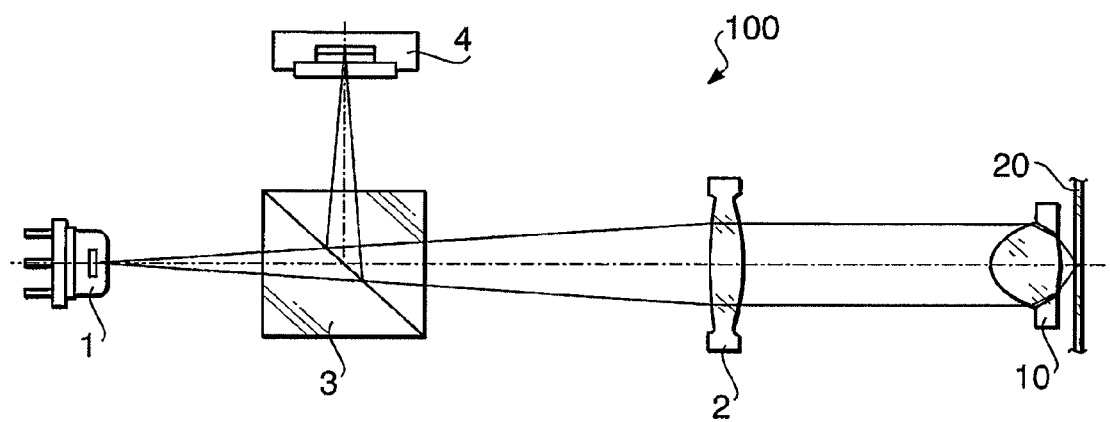
FIG. 1 is a block diagram of an optical pick-up having an objective lens according to an embodiment.

FIG. 1 is a block diagram of an optical pick-up 100 having an objective lens 10 according to the embodiment. The optical pick-up 100 includes a light source 1, a half mirror 3, a collimating lens 2, the objective lens 10, and a photodetector 4. In FIG. 1, a protective layer of an optical disc 20 (e.g., a blu-ray disc having a higher density that that of a DVD) is also illustrated. In the optical pick-up 100, a laser beam emitted by the light source 1 is collimated by the collimating lens 2 and is incident on the objective lens 10. The objective lens 10 converges the laser beam to form a beam spot on a record surface of the optical disc. The half mirror 3 located between the light source 1 and the collimating lens 2 reflects the laser beam returning from the optical disc toward the photodetector 4. The photodetector 4 has photoreception areas formed in predetermined patterns to reproduce a signal representing information recorded on the optical disc and to detect a tracking error signal and a focusing error signal.

Figure 2A:
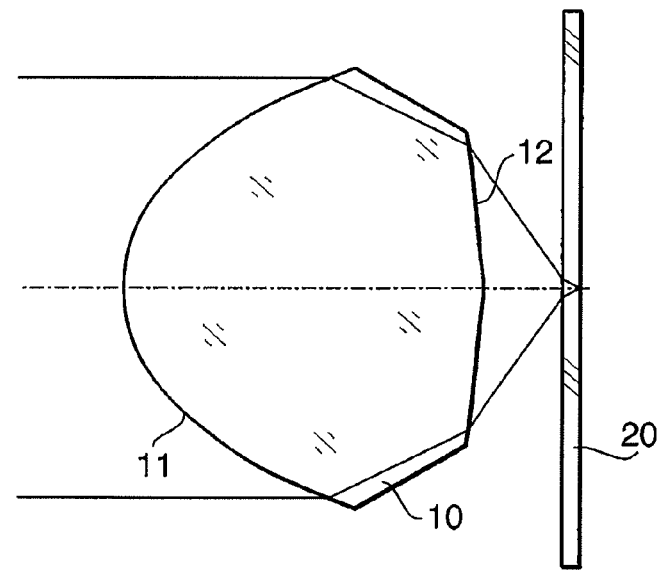
FIG. 2A is a cross-sectional view of an example of the objective lens.

FIG. 2A shows an example of the objective lens 10. As shown in FIG. 2A, the objective lens 10 is a biconvex lens made of plastic and has a numerical aperture (NA) larger than or equal to 0.75. Further, as shown in FIG. 2A, the objective lens 10 has a first surface 11 (i.e., light source side surface) and a second surface 12 (i.e., an optical disc side surface). The first surface 11 has an inflection point where a second derivative of a sag in an effective diameter of the first surface 11 is 0.

By forming the first surface 11 to have an inflection point, it is possible to prevent the gradient of the first surface 11 from becoming larger at a point closer to a perimeter of the first surface 11. Consequently, manufacture of the objective lens 10 and a mold thereof, measurement of surface conditions of the objective lens 10 and the mold, and coating of the objective lens 10 can be eased, and thereby bad effect on a property (e.g., a jitter amount) of an optical disc drive employing the objective lens 10 can be suppressed while preventing decrease of the light amount caused by decrease of transmissivity of the objective lens 10.

The objective lens 10 may be configured to satisfy a condition (1) and at least one of the following conditions (2) to (6).

$$0.94 < h(x) \leq 0.99 \quad (1)$$

$$1.15 < f < 1.45 \quad (2)$$

$$1.20 < (SAG1)'/n < 1.65 \quad (3)$$

$$-0.60 < ((SAG2)'/n)_{MIN} \leq -0.10 \quad (4)$$

$$0.77 < d/(f \cdot n) < 1.10 \quad (5)$$

$$-1.50 < r1/r2 < -0.60 \quad (6)$$

In the above described conditions, $h(x)$ represents a height of the inflection point in a pupil with respect to an optical axis of the objective lens 10, f represents a focal length of the objective lens 10, $(SAG1)'$ represents a first derivative of the sag of the first surface 11 at the inflection point, $((SAG2)'/n)_{MIN}$ represents the minimum value of $(SAG2)'/n$, $(SAG2)'$ represents a first derivative of the sag of the second surface 12, d represents a lens thickness, n represents a refractive index, r1 represents a radius of curvature of the first surface 11, and r2 represents a radius of curvature of the second surface 12.

The condition (1) defines the height of the inflection point in a pupil with respect to the optical axis of the objective lens 10. By satisfying the condition (1), it is possible to locate the inflection point at a proper point in the perimeter of the objective lens 10 while preventing the gradient of the first surface 11 from becoming steep while keeping a predetermined refractive power to correct an aberration excellently and to obtain a desirable focal length. If the height $h(x)$ gets larger than the upper limit of the condition (1), the inflection point lies outside the effective diameter. If the height $h(x)$ gets lower than the lower limit of the condition (1), the inflection point approaches the center of the objective lens 10, and thereby it becomes difficult to keep the predetermined refractive power.

The condition (2) defines the focal length of the objective lens 10. By satisfying the condition (2), it is possible to prevent deterioration of aberrations caused by temperature changes while maintaining a working distance required for the optical pick-up 100 on which the objective lens 10 is mounted. The change amount of a refractive index of a plastic lens due to a temperature change is larger than that of a glass lens, and the amount of the spherical aberration is proportional to the focal length. Therefore, by reducing the focal length f to a value lower than or equal to the upper limit of the condition (2), the amount of aberration caused by temperature changes can be suppressed. If the focal length f gets larger than the upper limit of the condition (2), the amount of the spherical aberration due to temperature changes becomes large. If the focal length f gets lower than the lower limit of the condition (2), it becomes difficult to secure the working distance.

The condition (3) defines a first derivative of a sag at the inflection point (i.e., the gradient of the first surface 11 at the inflection point). Since a plastic lens has a relatively low refractive index with respect to a glass lens, the plastic lens tends to have a steep surface shape to secure the predetermined refractive power relative to the glass lens. By satisfying the condition (3), it is possible to prevent the gradient of the first surface 11 from becoming too steep, and it is also possible to prevent the lens thickness from becoming too large because an appropriate thickness of an edge part of the objective lens 10 can be secured.

If $(SAG1)'/n$ gets larger than the upper limit of the condition (3), the gradient of the first surface 11 at the inflection point becomes too larger, and therefore the lens thickness of the objective lens 10 becomes too large. If $(SAG1)'/n$ gets lower than the lower limit of the condition (3), the gradient of the first surface 11 at the inflection point becomes too small, and therefore it becomes difficult to secure the predetermined refractive power.

The condition (4) defines the minimum value of the first derivative of a sag of the second surface 12 (i.e., the minimum value of the gradient of the second surface 12). Regarding the second surface 12, a sag of a convex surface has a negative sign, and the minimum value of the gradient means the steepest part of the second surface 12. By satisfying the condition (4), it becomes possible to prevent the gradient of the second surface 12 from becoming excessively large. If $((SAG2)'/n)_{MIN}$ gets larger than the upper limit of the condition (4), it becomes impossible to obtain the predetermined refractive power. If $((SAG2)'/n)_{MIN}$ gets smaller than the lower limit of the condition (4), the gradient of the second surface 12 becomes to steep and therefore it becomes impossible to secure an appropriate thickness of an edge part of the objective lens 10.

The condition (5) defines the lens thickness. The lens thickness is scaled depending on the focal length, and the lens thickness of a lens increases with decrease of a refractive index of the lens. For this reason, the definition regarding the lens thickness (i.e., the intermediate term of the condition (5)) contains the focal length f and the refractive index n in the denominator. By satisfying the condition (5), a desired thickness of the edge part of the objective lens 10 can be secured while maintaining a required working distance. If $d/(f \cdot n)$ gets larger than the upper limit of the condition (5), the lens thickness becomes too large, and therefore it becomes difficult to maintain a required working distance. If $d/(f \cdot n)$ gets smaller than the lower limit of the condition (5), the lens thickness becomes too small, and therefore it becomes impossible to secure an appropriate thickness of the edge part of the objective lens 10.

The condition (6) defines allocation of power to the surfaces 11 and 12 of the objective lens 10. By satisfying the condition (6), it becomes possible to achieve a balance between an off-axis property and a property of an eccentric coma of the objective lens 10. The off-axis property means a coma caused when an incident beam entering the objective lens 10 tilts with respect to the optical axis of the objective lens 10. Since the focal length is determined by the condition (2), the radius of curvature of the second surface 12 is determined by determining the radius of curvature of the first surface 11. Therefore, the degree of freedom regarding the radius of curvature is 1. In this case, it is impossible to simultaneously correct the coma of the off-axis property and the eccentric comma. For this reason, in this embodiment, the radius of curvature is determined to achieve a balance between the off-axis property and the property of the eccentric coma. If r1/r2 falls outside the defined range of the condition (6), it becomes difficult to correct both the coma of the off-axis property and the eccentric coma.

An anti-reflection coating may be formed on each of the first surface 11 and the second surface 12 of the objective lens 10. The anti-reflection coating formed on the first surface 11 of the objective lens 10 satisfies a condition:

$$1.00 < Tp/Tc < 1.40 \quad (7)$$

where Tc represents transmissivity of a circular central part defined within a range of 10 percent of an effective diameter with respect to the center of the first surface 11, and Tp represents transmissivity of a ring-shaped part defined outside of 90 percent of the effective diameter with respect to the center of the first surface 11.

The anti-reflection coating formed on the first surface 11 of the objective lens 10 may further satisfy a condition:

$$1.75 < \lambda_0/\lambda_{min} < 2.00 \quad (8)$$

where $\lambda_0$ represents a wavelength at which the reflectivity of the anti-reflection coating takes a minimum value for a beam incident perpendicularly on the anti-reflection coating, and $\lambda_{min}$ represents a minimum wavelength of wavelengths of used laser beams.

By satisfying the conditions (7) and (8), the transmissivity in the perimeter of the objective lens 10 becomes larger than that in the central part of the objective lens 10, and therefore it becomes possible to increase the rim intensity. If the intermediate terms of the conditions (7) and (8) get smaller than the respective lower limits of the conditions (7) and (8), the transmissivity in the perimeter becomes relatively small, and therefore it is impossible to increase the rim intensity. If the intermediate terms of the conditions (7) and (8) get larger than the respective upper limits of the conditions (7) and (8), the total transmissivity becomes small, and therefore the use efficiency of light decrease.

The refractive index of the objective lens 10 is set to a value smaller than 1.58 with respect to the laser beam having the minimum wavelength $\lambda_{min}$ of all of wavelengths of the used laser beams. The anti-reflection coating on the first surface 11 is formed to have two layers, and the anti-reflection coating on the second surface 12 is formed to have two to four layers. Since in general a plastic lens has a smaller refractive index than that of a glass lens, the plastic lens has a difference between the material of the lens and the material of the coating smaller than that of the glass lens. Therefore, if a coating is formed in a single layer structure, it is difficult to achieve adequate performance of anti-reflection. For this reason, in this embodiment, the coating having two or more layers is employed.

Since the first surface 11 has the steeper gradient than that of the second surface 12, it is difficult to form a coating having a large number of layers on the first surface 11. In addition, if a coating having a large number of layers is employed, uniformity of coatings of finished products can not be achieved. For this reason, the coating on the first surface 11 is formed to be a two-layer structure.

Since the gradient of the second surface 12 is gentler than that of the first surface 11, the coating on the second surface is formed to be a two to four layer structure, and therefore it becomes possible to maintain the reflectivity at a low level. However, if the coating on the second surface 12 is formed to have more than four layers, it becomes difficult to form the coating on the second surface 12, and thereby it becomes difficult to maintain the uniformity of coatings of finished products.

Hereafter, five concrete examples according to the embodiment are described.

First Example

In FIG. 2A, the objective lens 10 according to a first example provided in the optical pick-up 100 is illustrated. In FIG. 2A, a protective layer of the optical disc 20 is also illustrated. Table 1 shows a numerical configuration of the objective lens 10 according to the first example. In Table 1 (and in the following similar tables), "f" represents the focal length, "NA" represents a numerical aperture, "m" represents the magnification, "r" represents a radius of curvature of a surface, "d" represents a distance from a surface to a next surface along the optical axis (unit: mm), and "n" represents a refractive index at a design wavelength.

TABLE 1

| f = 1.400 NA0.85 m = 0 | | | |
|---|---|---|---|
| Surface No. | r | d | n |
| 1 | 0.911 | 1.800 | 1.525 |
| 2 | −1.214 | 0.394 | |
| 3 | ∞ | 0.0875 | 1.622 |
| 4 | ∞ | | |

In Table 1 (and in the following similar Tables), the surfaces Nos. 1 and 2 are the first and second surfaces 11 and 12 of the objective lens 10, respectively, and the surfaces Nos. 3 and 4 represent both of surfaces of the protective layer of the optical disc 20. The radius of curvature in Table 1 is a value defined along the optical axis.

Each of the surfaces 11 and 12 of the objective lens 10 is a rotationally-symmetrical aspherical surface. A rotationally symmetrical aspherical surface is expressed by a following equation:

$$X(h) = \frac{Ch^2}{1 + \sqrt{1 - (1+\kappa)C^2h^2}} + A_4 h^4 + A_6 h^6 + A_8 h^8 + \ldots + A_{22} h^{22}$$

where X(h) represents a SAG amount which is a distance between a point on the aspherical surface at a height of h from the optical axis and a plane tangential to the aspherical surface at the optical axis, $\kappa$ represents a conical coefficient, $A_4$, $A_6 \ldots A_{22}$ are aspherical coefficients of $4^{th}$, $6^{th} \ldots 22^{th}$ orders, respectively, and C is curvature of the rotationally symmetrical aspherical surface on the optical axis.

Table 2 shows the conical coefficient and the aspherical coefficients $A_4 \ldots A_{22}$ of the objective lens 10 according to the first example.

TABLE 2

| | $1^{st}$ surface | $2^{nd}$ surface |
|---|---|---|
| $\kappa$ | −0.670 | 0.000 |
| $A_4$ | $2.66600 \times 10^{-02}$ | 2.03200 |
| $A_6$ | $5.82200 \times 10^{-02}$ | −8.80400 |
| $A_8$ | $-2.87600 \times 10^{-01}$ | $2.95000 \times 10^{+01}$ |
| $A_{10}$ | 1.07300 | $-6.62300 \times 10^{+01}$ |
| $A_{12}$ | −2.27000 | $9.69710 \times 10^{+01}$ |
| $A_{14}$ | 2.89220 | $-9.08970 \times 10^{+01}$ |

TABLE 2-continued

|  | $1^{st}$ surface | $2^{nd}$ surface |
|---|---|---|
| $A_{16}$ | −2.17280 | $5.18280 \times 10^{+01}$ |
| $A_{18}$ | $8.60090 \times 10^{-01}$ | $-1.56360 \times 10^{+01}$ |
| $A_{20}$ | $-1.12350 \times 10^{-01}$ | 1.41040 |
| $A_{22}$ | $-1.48970 \times 10^{-02}$ | $2.20650 \times 10^{-01}$ |

Figure 2B:
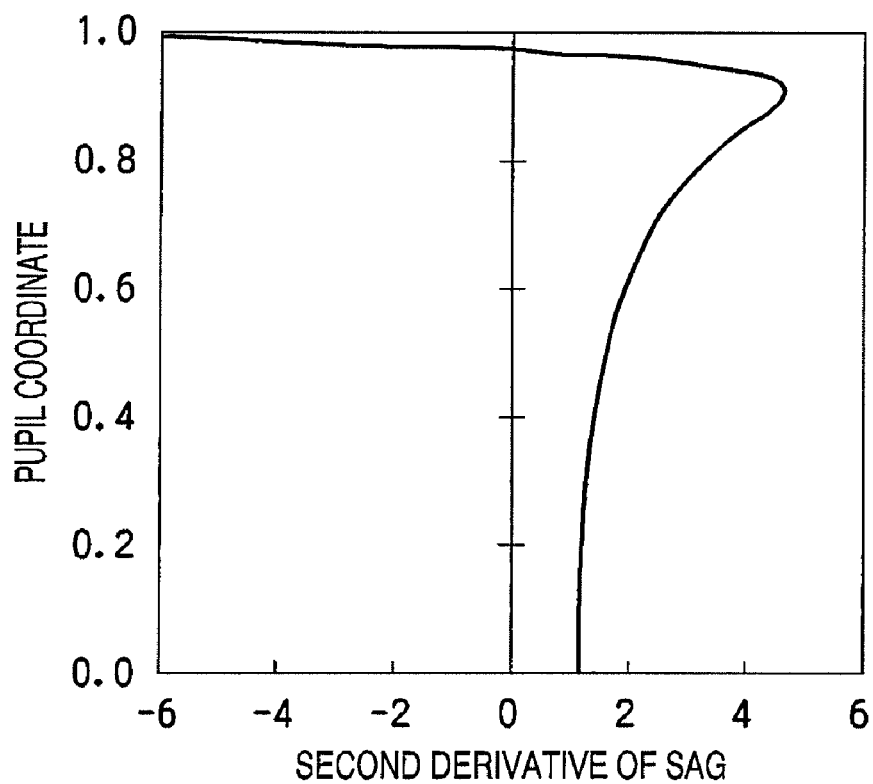
FIG. 2B is a graph illustrating a second derivative of a sag of a first surface of the objective lens with respect to the height in a pupil.

FIG. 2B is a graph illustrating a second derivative of a sag of the first surface 11 with respect to the height in a pupil. As shown in FIG. 2B, the sag has a point at which the second derivative thereof becomes zero. That is, the first surface 11 has an inflection point. At the inflection point, the shape of the surface starts to warp inversely.

A two-layer anti-reflection coating is formed on each of the first surface 11 and the second surface 12. Table 3 shows numerical configurations of the anti-reflection coatings formed on the first surface 11 and the second surface 12. In Table 3, a first layer is a layer which contacts a lens surface and a second layer is a layer formed to be stacked on the first layer. For each of the coatings formed on the first surface 11 and the second surface 12, the first layer is a medium with a refractive index of 2.07 and the second layer is a medium with a refractive index of 1.46. However, the thicknesses of the first layers of the first surface 11 and the second surface 12 are different from each other, and the thicknesses of the second layers of the first surface 11 and the second surface 12 are different from each other. Therefore, the wavelength $\lambda_0$ at which reflectivity of the coating on the first surface 11 takes a minimum value for a laser beam incident perpendicularly on the coating on the first surface 11 is different from the wavelength $\lambda_0$ at which reflectivity of the coating on the second surface 12 takes a minimum value for a laser beam incident perpendicularly on the coating on the second surface 12.

TABLE 3

|  |  | $1^{st}$ surface | $2^{nd}$ surface | refractive index ($\lambda$ = 550 nm) |
|---|---|---|---|---|
| thickness of coating | $1^{st}$ layer | 47.1 nm | 44.1 nm | 2.07 |
|  | $2^{nd}$ layer | 150.7 nm | 94.9 nm | 1.46 |
| $\lambda_0$ |  | 730 nm | 500 nm |  |
| $\lambda_0/\lambda_{min}$ ($\lambda_{min}$ = 405 nm) |  | 1.80 | 1.23 |  |

Figure 3:
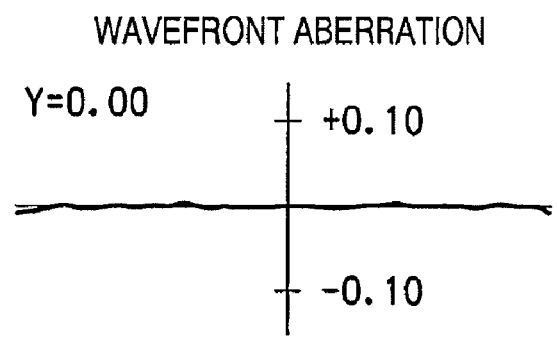
FIG. 3 is a graph representing a wavefront aberration of the objective lens according to a first example.
Figure 4:
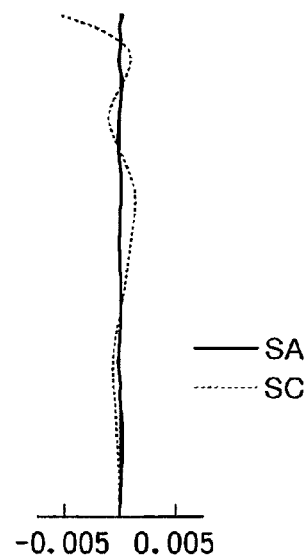
FIG. 4 is a graph representing the spherical aberration and the sine condition of the objective lens according to the first example.
Figure 5:
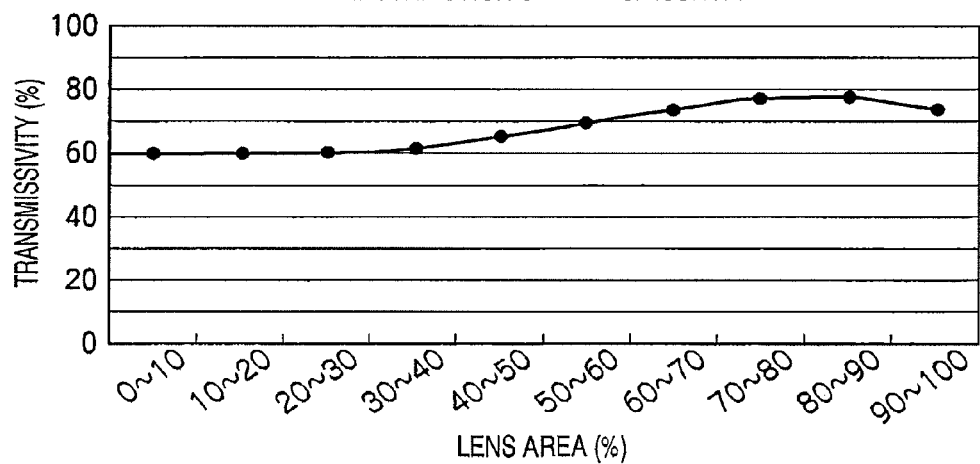
FIG. 5 is a graph illustrating distribution of transmissivity of the objective lens on which anti-reflection coatings are formed.

FIGS. 3 to 5 show the optical performance of the objective lens 10 according to the first example. FIG. 3 is a graph representing the wavefront aberration on the optical axis, and FIG. 4 is a graph representing the spherical aberration (SA) and the sine condition (SC). FIG. 5 is a graph illustrating distribution of transmissivity of the objective lens 10 on which the anti-reflection coatings shown in Tables 3 are formed. The transmissivity Tc of the circular central part defined within the range of 10 percent of the effective diameter with respect to the center of the first surface 11 is approximately 60 percent, and the transmissivity Tp of the ring-shaped part defined outside of 90 percent of the effective diameter with respect to the center of the first surface 11 is approximately 72 percent. In this case, Tp/Tc is 1.20, and therefore the condition (7) is satisfied. Further, for the anti-reflection coating on the first surface 11, $\lambda_0/\lambda_{min}$ is 1.80. Therefore, the condition (8) is satisfied. Consequently, it is possible to configure the objective lens 10 to have a sufficient rim intensity and to form a suitable beam spot.

In the following second to fifth examples, the objective lens 10 is provided with anti-reflection coatings having the same structures as those shown in Table 3.

Second Example

Figure 6:
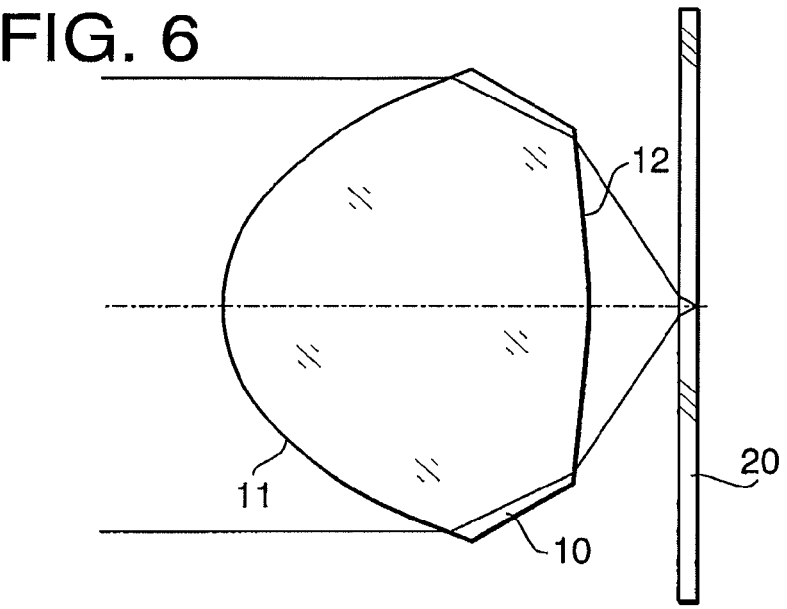
FIG. 6 is a cross sectional view of the objective lens according to a second example.

FIG. 6 illustrates a lens configuration of the objective lens 10 according to a second example. In FIG. 6, a protective layer of an optical disc 20 is also illustrated. Table 4 shows a numerical configuration of the objective lens 10 according to the second example.

TABLE 4

| f = 1.400 NA0.85 m = 0 | | | |
|---|---|---|---|
| Surface No. | r | d | n |
| 1 | 0.904 | 1.73 | 1.525 |
| 2 | −1.338 | 0.424 |  |
| 3 | ∞ | 0.0875 | 1.622 |
| 4 | ∞ |  |  |

Table 5 shows the conical coefficient and the aspherical coefficients $A_4 \ldots A_{22}$ of the objective lens 10 according to the second example.

TABLE 5

|  | $1^{st}$ surface | $2^{nd}$ surface |
|---|---|---|
| $\kappa$ | −0.670 | 0.000 |
| $A_4$ | $2.68900 \times 10^{-02}$ | 1.65800 |
| $A_6$ | $6.53600 \times 10^{-02}$ | −6.48700 |
| $A_8$ | $-3.27100 \times 10^{-01}$ | $1.96800 \times 10^{+01}$ |
| $A_{10}$ | 1.18500 | $-3.97000 \times 10^{+01}$ |
| $A_{12}$ | −2.41700 | $5.14200 \times 10^{+01}$ |
| $A_{14}$ | 2.917500 | $-4.15060 \times 10^{+01}$ |
| $A_{16}$ | −1.99760 | $1.90660 \times 10^{+01}$ |
| $A_{18}$ | $6.31800 \times 10^{-01}$ | −3.47460 |
| $A_{20}$ | $8.96930 \times 10^{-03}$ | $-5.57150 \times 10^{-01}$ |
| $A_{22}$ | $-3.96510 \times 10^{-02}$ | $2.43540 \times 10^{-01}$ |

Figure 7:
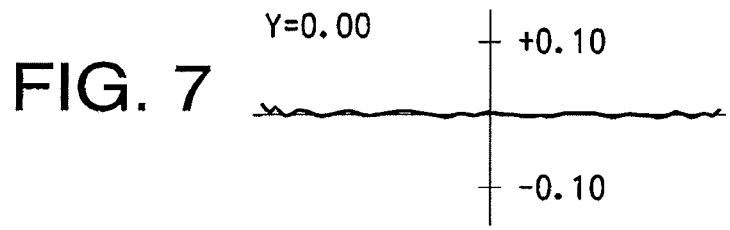
FIG. 7 is a graph representing a wavefront aberration of the objective lens according to the second example.
Figure 8:
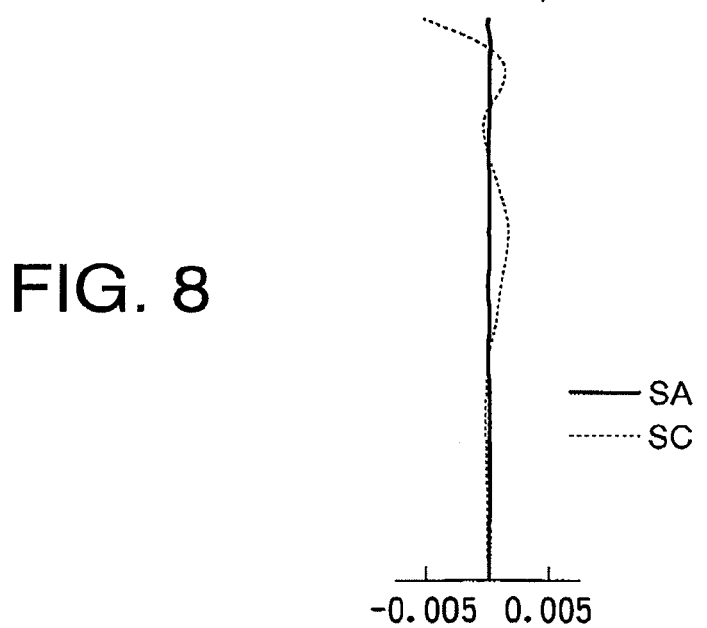
FIG. 8 is a graph representing the spherical aberration and the sine condition of the objective lens according to the second example.

FIGS. 7 and 8 show the optical performance of the objective lens 10 according to the second example. FIG. 7 is a graph representing the wavefront aberration on the optical axis, and FIG. 8 is a graph representing the spherical aberration (SA) and the sine condition (SC).

Third Example

Figure 9:
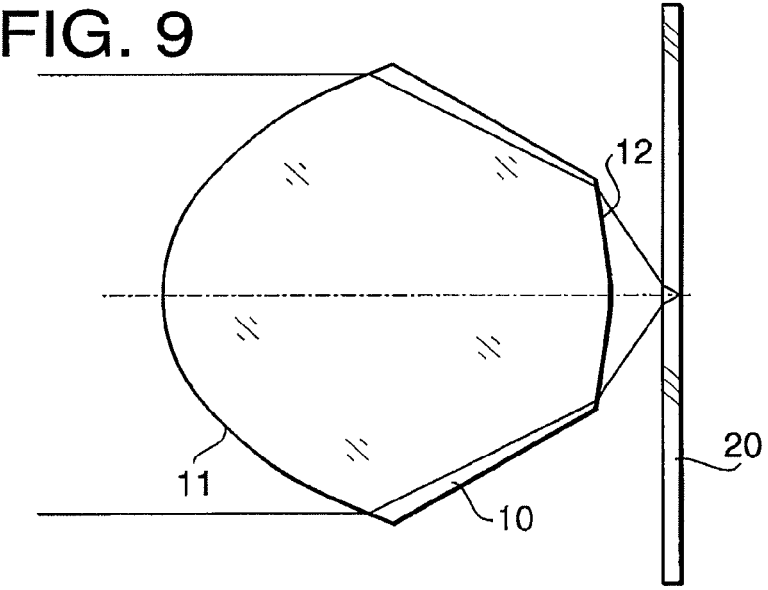
FIG. 9 is a cross sectional view of the objective lens according to a third example.

FIG. 9 illustrates a lens configuration of the objective lens 10 according to a third example. In FIG. 9, a protective layer of an optical disc 20 is also illustrated. Table 6 shows a numerical configuration of the objective lens 10 according to the third example.

TABLE 6

| f = 1.400 NA0.85 m = 0 | | | |
|---|---|---|---|
| Surface No. | r | d | n |
| 1 | 0.953 | 2.17 | 1.525 |
| 2 | −0.694 | 0.249 |  |
| 3 | ∞ | 0.0875 | 1.622 |
| 4 | ∞ |  |  |

Table 7 shows the conical coefficient and the aspherical coefficients $A_4 \ldots A_{22}$ of the objective lens 10 according to the third example.

TABLE 7

|  | $1^{st}$ surface | $2^{nd}$ surface |
|---|---|---|
| κ | −0.670 | 0.000 |
| $A_4$ | $2.62700 \times 10^{-02}$ | 6.97100 |
| $A_6$ | $1.08800 \times 10^{-02}$ | $-5.55600 \times 10^{+01}$ |
| $A_8$ | $1.60000 \times 10^{-02}$ | $3.37400 \times 10^{+02}$ |
| $A_{10}$ | $-9.21600 \times 10^{-03}$ | $-1.33250 \times 10^{+03}$ |
| $A_{12}$ | $-8.54300 \times 10^{-03}$ | $3.17550 \times 10^{+03}$ |
| $A_{14}$ | $5.35100 \times 10^{-03}$ | $-3.04240 \times 10^{+03}$ |
| $A_{16}$ | $6.99400 \times 10^{-02}$ | $-6.08950 \times 10^{+03}$ |
| $A_{18}$ | $-1.36630 \times 10^{-01}$ | $2.58250 \times 10^{+04}$ |
| $A_{20}$ | $9.66000 \times 10^{-02}$ | $-3.73800 \times 10^{+04}$ |
| $A_{22}$ | $-2.41670 \times 10^{-02}$ | $2.12460 \times 10^{+04}$ |

Figure 10:
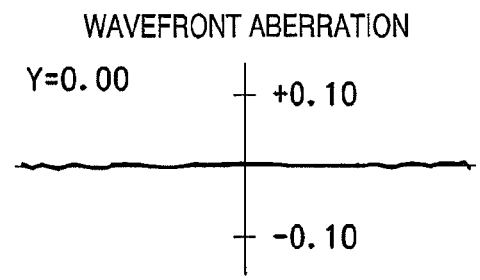
FIG. 10 is a graph representing a wavefront aberration of the objective lens according to the third example.
Figure 11:
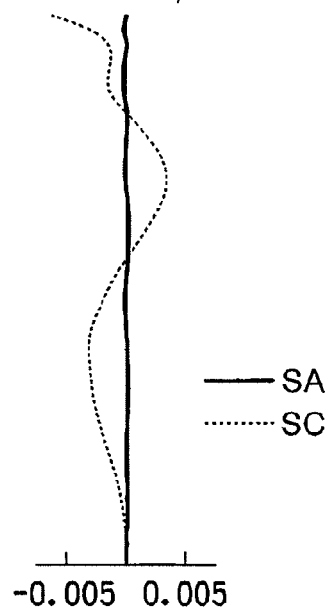
FIG. 11 is a graph representing the spherical aberration and the sine condition of the objective lens according to the third example.

FIGS. 10 and 11 show the optical performance of the objective lens 10 according to the third example. FIG. 10 is a graph representing the wavefront aberration on the optical axis, and FIG. 11 is a graph representing the spherical aberration (SA) and the sine condition (SC).

Fourth Example

Figure 12:
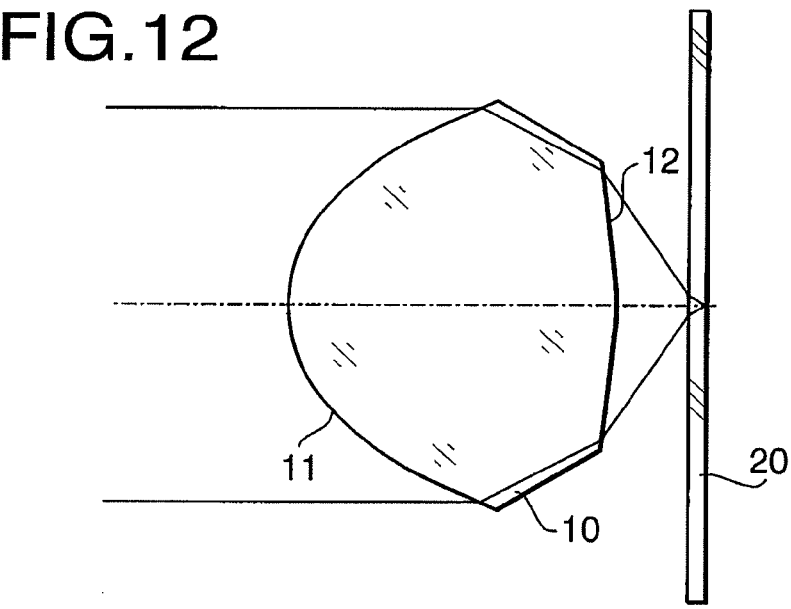
FIG. 12 is a cross sectional view of the objective lens according to a fourth example.

FIG. 12 illustrates a lens configuration of the objective lens 10 according to a fourth example. In FIG. 12, a protective layer of an optical disc 20 is also illustrated. Table 8 shows a numerical configuration of the objective lens 10 according to the fourth example.

TABLE 8

| f = 1.200 NA0.85 m = 0 | | | |
|---|---|---|---|
| Surface No. | r | d | n |
| 1 | 0.782 | 1.55 | 1.525 |
| 2 | −1.027 | 0.328 | |
| 3 | ∞ | 0.0875 | 1.622 |
| 4 | ∞ | | |

Table 9 shows the conical coefficient and the aspherical coefficients $A_4 \ldots A_{22}$ of the objective lens 10 according to the fourth example.

TABLE 9

|  | $1^{st}$ surface | $2^{nd}$ surface |
|---|---|---|
| κ | −0.670 | 0.000 |
| $A_4$ | $4.43000 \times 10^{-02}$ | 3.34200 |
| $A_6$ | $9.46800 \times 10^{-02}$ | $-2.04800 \times 10^{+01}$ |
| $A_8$ | $-5.47000 \times 10^{-01}$ | $9.91240 \times 10^{+01}$ |
| $A_{10}$ | 2.79800 | $-3.23600 \times 10^{+02}$ |
| $A_{12}$ | −7.95200 | $6.87290 \times 10^{+02}$ |
| $A_{14}$ | $1.34000 \times 10^{-01}$ | $-9.23280 \times 10^{+02}$ |
| $A_{16}$ | $-1.28040 \times 10^{-01}$ | $7.26780 \times 10^{+02}$ |
| $A_{18}$ | 5.61100 | $-2.57300 \times 10^{+02}$ |
| $A_{20}$ | $1.94000 \times 10^{-01}$ | $-2.42030 \times 10^{+01}$ |
| $A_{22}$ | $-7.33360 \times 10^{-01}$ | $3.31030 \times 10^{+01}$ |

Figure 13:
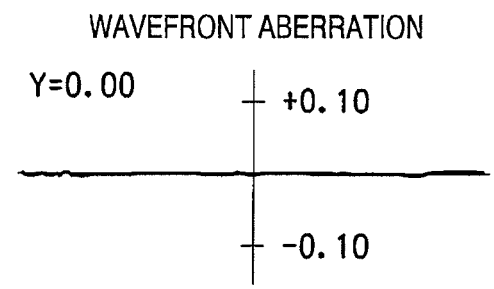
FIG. 13 is a graph representing a wavefront aberration of the objective lens according to the fourth example.
Figure 14:
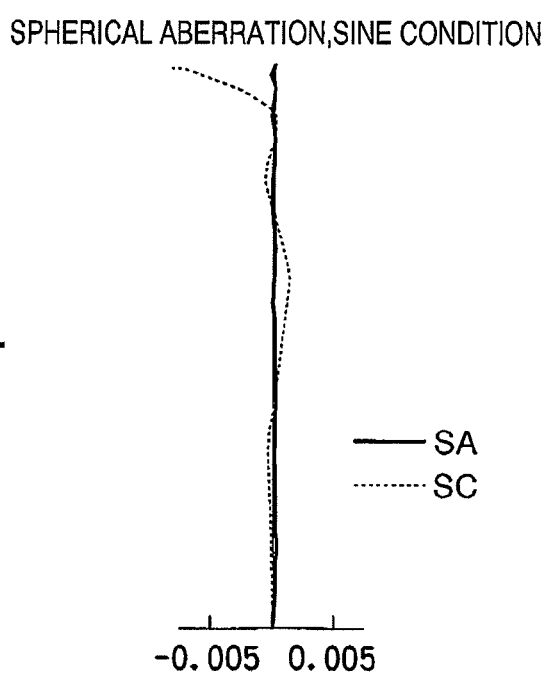
FIG. 14 is a graph representing the spherical aberration and the sine condition of the objective lens according to the fourth example.

FIGS. 13 and 14 show the optical performance of the objective lens 10 according to the fourth example. FIG. 13 is a graph representing the wavefront aberration on the optical axis, and FIG. 14 is a graph representing the spherical aberration (SA) and the sine condition (SC).

Fifth Example

Figure 15:
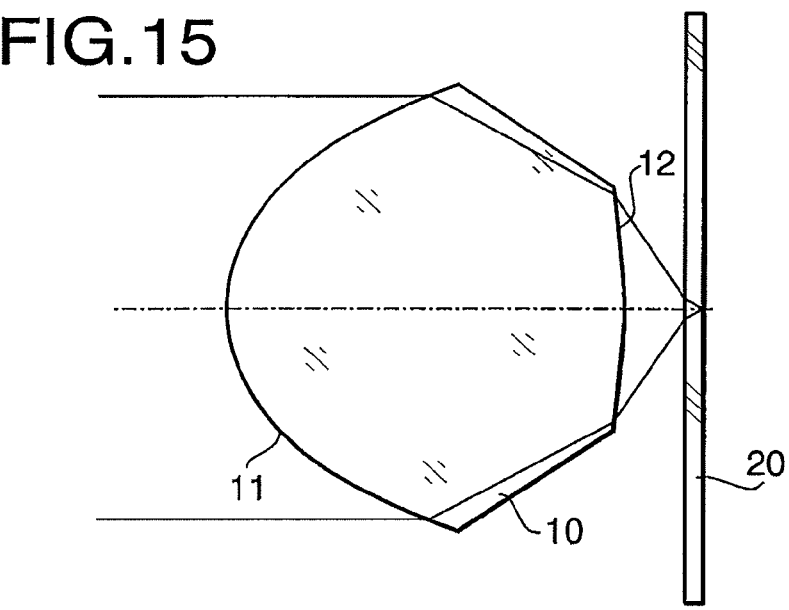
FIG. 15 is a cross sectional view of the objective lens according to a fifth example.

FIG. 15 illustrates a lens configuration of the objective lens 10 according to a fifth example. In FIG. 15, a protective layer of an optical disc 20 is also illustrated. Table 10 shows a numerical configuration of the objective lens 10 according to the fifth example.

TABLE 10

| f = 1.300 NA0.85 m = 0 | | | |
|---|---|---|---|
| Surface No. | r | d | n |
| 1 | 0.868 | 1.90 | 1.525 |
| 2 | −0.786 | 0.350 | |
| 3 | ∞ | 0.0875 | 1.622 |
| 4 | ∞ | | |

Table 11 shows the conical coefficient and the aspherical coefficients $A_4 \ldots A_{22}$ of the objective lens 10 according to the fifth example.

TABLE 11

|  | $1^{st}$ surface | $2^{nd}$ surface |
|---|---|---|
| κ | −0.670 | 0.000 |
| $A_4$ | $3.40800 \times 10^{-02}$ | 3.94700 |
| $A_6$ | $3.88400 \times 10^{-02}$ | $-2.84900 \times 10^{+01}$ |
| $A_8$ | $-1.25300 \times 10^{-01}$ | $1.23000 \times 10^{+02}$ |
| $A_{10}$ | $5.67700 \times 10^{-01}$ | $-4.15150 \times 10^{+02}$ |
| $A_{12}$ | −1.32500 | $9.35650 \times 10^{+02}$ |
| $A_{14}$ | 1.79700 | $-1.38010 \times 10^{+03}$ |
| $A_{16}$ | −1.28600 | $1.27040 \times 10^{+03}$ |
| $A_{18}$ | $2.72000 \times 10^{-01}$ | $-6.43180 \times 10^{+02}$ |
| $A_{20}$ | $1.92360 \times 10^{-01}$ | $1.12940 \times 10^{+02}$ |
| $A_{22}$ | $-9.36830 \times 10^{-02}$ | $1.93090 \times 10^{+01}$ |

Figure 16:
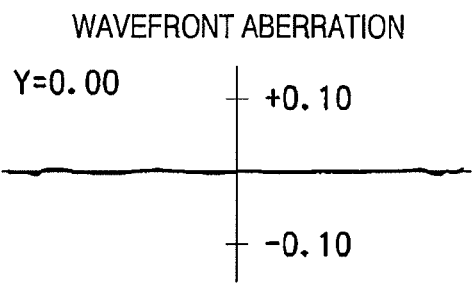
FIG. 16 is a graph representing a wavefront aberration of the objective lens according to the fifth example.
Figure 17:
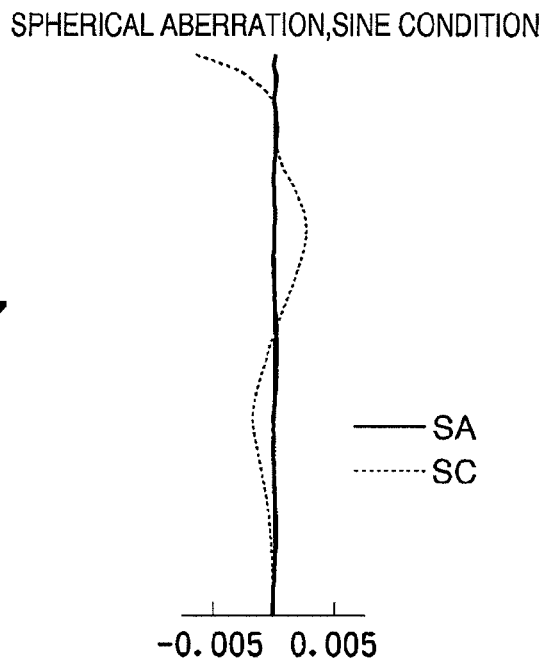
FIG. 17 is a graph representing the spherical aberration and the sine condition of the objective lens according to the fifth example.

FIGS. 16 and 17 show the optical performance of the objective lens 10 according to the fifth example. FIG. 16 is a graph representing the wavefront aberration on the optical axis, and FIG. 17 is a graph representing the spherical aberration (SA) and the sine condition (SC).

Table 12 shows values regarding the conditions (1) to (6) of each of the above mentioned first to fifth examples. As shown in Table 12, all of the first to fifth examples satisfy all of the conditions (1) to (6).

TABLE 12

| Condition | $1^{st}$ Example | $2^{nd}$ Example | $3^{rd}$ Example | $4^{th}$ Example | $5^{th}$ Example |
|---|---|---|---|---|---|
| (1) h(x) | 0.97 | 0.97 | 0.99 | 0.97 | 0.99 |
| (2) f | 1.40 | 1.40 | 1.40 | 1.20 | 1.30 |
| (3) (SAG1)'/n | 1.51 | 1.55 | 1.41 | 1.51 | 1.56 |
| (4) ((SAG2)'/n)$_{MIN}$ | −0.17 | −0.15 | −0.16 | −0.16 | −0.46 |
| (5) d/(f · n) | 0.84 | 0.81 | 1.02 | 0.85 | 0.96 |
| (6) r1/r2 | −0.75 | −0.68 | −1.37 | −0.76 | −1.10 |

Although the present invention has been described in considerable detail with reference to certain preferred embodiments thereof, other embodiments are possible.

This application claims priority of Japanese Patent Application No. P2007-017675, filed on Jan. 29, 2007. The entire subject matter of the application is incorporated herein by reference.

What is claimed is:

1. An objective lens for an optical pick-up,
the objective lens being formed to be a single-element plastic lens having a first surface and a second surface,
the first surface being configured to have, within an effective diameter, an inflection point at which a second derivative of a sag of the first surface takes a value of 0,
the objective lens having a numerical aperture larger than or equal to 0.75, and the sag being defined as a distance between a point on an aspherical surface at a height from the optical axis and a plane tangential to the aspherical surface at the optical axis.

2. The objective lens according to claim 1, wherein the objective lens satisfies a condition:

$$0.94 < h(x) \leq 0.99 \quad (1)$$

where h(x) represents a height of the inflection point in a pupil with respect to an optical axis of the objective lens.

3. The objective lens according to claim 1, wherein the objective lens satisfies a condition:

$$1.15 < f < 1.45 \quad (2)$$

where f represents a focal length of the objective lens.

4. The objective lens according to claim 1, wherein the objective lens satisfies a condition:

$$1.20 < (SAG1)'/n < 1.65 \quad (3)$$

where (SAG1)' represents a first derivative of the sag of the first surface at the inflection point and n represents a refractive index of the objective lens.

5. The objective lens according to claim 1, wherein the objective lens satisfies a condition:

$$-0.60 < ((SAG2)'/n)_{MIN} \leq -0.10 \quad (4)$$

where $((SAG2)'/n)_{MIN}$ represents a minimum value of (SAG2)'/n, (SAG2)' represents a first derivative of a sag of the second surface, and n represents a refractive index of the objective lens.

6. The objective lens according to claim 1, wherein the objective lens satisfies a condition:

$$0.77 < d/(f \cdot n) < 1.10 \quad (5)$$

where f represents a focal length of the objective lens, d represents a lens thickness of the objective lens, and n represents a refractive index of the objective lens.

7. The objective lens according to claim 1, wherein the objective lens satisfies a condition:

$$-1.50 < r1/r2 < -0.60 \quad (6)$$

where r1 represents a radius of curvature of the first surface, and r2 represents a radius of curvature of the second surface.

8. The objective lens according to claim 1, wherein the first surface is located on a light source side and the second surface is located on an optical disc side.

9. The objective lens according to claim 1, wherein the first surface has an anti-reflection coating formed thereon, wherein the anti-reflection coating formed on the first surface satisfies a condition:

$$1.00 < Tp/Tc < 1.40 \quad (7)$$

where Tc represents transmissivity of a circular central part defined within a range of 10 percent of the effective diameter with respect to a center of the first surface, and Tp represents transmissivity of a ring-shaped part defined outside of 90 percent of the effective diameter with respect to the center of the first surface, wherein the objective lens satisfies a condition:

$$1.75 < \lambda_0/\lambda_{min} < 2.00 \quad (8)$$

where $\lambda_0$ represents a wavelength at which reflectivity of the anti-reflection coating takes a minimum value for a beam incident perpendicularly on the anti-reflection coating, and $\lambda_{min}$ represents a minimum wavelength of wavelengths of laser beams to be used.

10. The objective lens according to claim 9, wherein the objective lens has a refractive index lower than 1.58 with respect to the minimum wavelength $\lambda_{min}$ of all of the wavelengths of the laser beams to be used.

11. The objective lens according to claim 9, wherein the anti-reflection coating formed on the first surface has a two-layer structure, wherein the second surface has an anti-reflection coating formed thereon, wherein the anti-reflection coating formed on the second surface has a two to four-layer structure.

12. The objective lens according to claim 1, wherein the aspherical surface is expressed by the following equation:

$$X(h) = \frac{Ch^2}{1 + \sqrt{1-(1+\kappa)C^2h^2}} + A_4h^4 + A_6h^6 + A_8h^8 + \ldots + A_{22}h^{22}$$

wherein X(h) represents the sag amount;
h is the height from the optical axis;
κ represents a conical coefficient;
$A_4, A_6 \ldots A_{22}$ are aspherical coefficients of $4^{th}, 6^{th} \ldots 22^{nd}$ orders, respectively; and
C is curvature of the aspherical surface on the optical axis.

13. An optical system of an optical pick-up, comprising:
a light source which emits a light beam; and
an objective lens on which the light beam is incident, wherein:
the objective lens is formed to be a single-element plastic lens having a first surface and a second surface;
the first surface is configured to have, within an effective diameter, an inflection point at which a second derivative of a sag of the first surface takes a value of 0;
the objective lens has a numerical aperture larger than or equal to 0.75; and
the sag is defined as a distance between a point on an aspherical surface at a height from the optical axis and a plane tangential to the aspherical surface at the optical axis.

14. The optical system according to claim 13, wherein the objective lens satisfies a condition:

$$0.94 < h(x) \leq 0.99 \quad (1)$$

where h(x) represents a height of the inflection point in a pupil with respect to an optical axis of the objective lens.

15. The optical system according to claim 13, wherein the objective lens satisfies a condition:

$$1.15 < f < 1.45 \quad (2)$$

where f represents a focal length of the objective lens.

16. The optical system according to claim 13, wherein the objective lens satisfies a condition:

$$1.20 < (SAG1)'/n < 1.65 \quad (3)$$

where (SAG1)' represents a first derivative of the sag of the first surface at the inflection point and n represents a refractive index of the objective lens.

17. The optical system according to claim 13, wherein the objective lens satisfies a condition:

$$-0.60 < ((SAG2)'/n)_{MIN} \leq -0.10 \quad (4)$$

where $((SAG2)'/n)_{MIN}$ represents a minimum value of (SAG2)'/n, (SAG2)' represents a first derivative of a sag of the second surface, and n represents a refractive index of the objective lens.

18. The optical system according to claim 13,
wherein the objective lens satisfies a condition:

$$0.77 < d/(f \cdot n) < 1.10 \quad (5)$$

where f represents a focal length of the objective lens, d represents a lens thickness of the objective lens, and n represents a refractive index of the objective lens.

19. The optical system according to claim 13,
wherein the objective lens satisfies a condition:

$$-1.50 < r1/r2 < -0.60 \quad (6)$$

where r1 represents a radius of curvature of the first surface, and r2 represents a radius of curvature of the second surface.

20. The optical system according to claim 13, wherein the first surface is located on a light source side and the second surface is located on an optical disc side.

21. The optical system according to claim 13,
wherein the first surface has an anti-reflection coating formed thereon,
wherein the anti-reflection coating formed on the first surface satisfies a condition:

$$1.00 < Tp/Tc < 1.40 \quad (7)$$

where Tc represents transmissivity of a circular central part defined within a range of 10 percent of the effective diameter with respect to a center of the first surface, and Tp represents transmissivity of a ring-shaped part defined outside of 90 percent of the effective diameter with respect to the center of the first surface,
wherein the objective lens satisfies a condition:

$$1.75 < \lambda_0/\lambda_{min} < 2.00 \quad (8)$$

where $\lambda_0$ represents a wavelength at which reflectivity of the anti-reflection coating takes a minimum value for a beam incident perpendicularly on the anti-reflection coating, and $\lambda_{min}$ represents a minimum wavelength of wavelengths of laser beams to be used.

22. The optical system according to claim 13, wherein the aspherical surface is expressed by the following equation:

$$X(h) = \frac{Ch^2}{1 + \sqrt{1 - (1+\kappa)C^2 h^2}} + A_4 h^4 + A_6 h^6 + A_8 h^8 + \ldots + A_{22} h^{22}$$

wherein X(h) represents the sag amount;
h is the height from the optical axis;
$\kappa$ represents a conical coefficient;
$A_4, A_6 \ldots A_{22}$ are aspherical coefficients of $4^{th}, 6^{th} \ldots 22^{nd}$ orders, respectively; and
C is curvature of the aspherical surface on the optical axis.

\* \* \* \* \*